United States Patent
Uehara (10) Patent No.: US 12,488,808 B2
(45) Date of Patent: Dec. 2, 2025

(54) DISK DEVICE AND RAMP

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Manabu Uehara, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 22 days.

(21) Appl. No.: 18/597,216

(22) Filed: Mar. 6, 2024

(65) Prior Publication Data

US 2025/0157489 A1    May 15, 2025

(30) Foreign Application Priority Data

Nov. 14, 2023 (JP) ................. 2023-193449

(51) Int. Cl.
  *G11B 21/22*    (2006.01)
  *G11B 5/48*    (2006.01)
  *G11B 5/54*    (2006.01)

(52) U.S. Cl.
  CPC ............ *G11B 21/22* (2013.01); *G11B 5/4826* (2013.01); *G11B 5/54* (2013.01)

(58) Field of Classification Search
  None
  See application file for complete search history.

(56) References Cited

U.S. PATENT DOCUMENTS

| | | | | |
|---|---|---|---|---|
| 6,137,658 A | * | 10/2000 | Matsuzaki | ............. G11B 5/54 |
| 6,163,440 A | * | 12/2000 | Takahashi | ............. G11B 21/22 |
| 6,226,154 B1 | | 5/2001 | Albrecht | |
| 7,236,331 B2 | | 6/2007 | Ramsdell | |
| 7,295,405 B2 | | 11/2007 | Arikawa | |
| 7,672,083 B1 | * | 3/2010 | Yu | ......................... G11B 21/22 |
| | | | | 360/254.9 |
| 8,493,690 B1 | * | 7/2013 | Ono | ...................... G11B 21/22 |
| | | | | 360/254.8 |
| 9,536,552 B1 | * | 1/2017 | Chen | ..................... G11B 21/22 |

(Continued)

FOREIGN PATENT DOCUMENTS

| | | | | |
|---|---|---|---|---|
| JP | 2008210476 A | * | 9/2008 | ............ G11B 21/12 |
| KR | 20080074362 A | * | 8/2008 | ........... G11B 5/4833 |

*Primary Examiner* — William J Klimowicz
(74) *Attorney, Agent, or Firm* — Knobbe, Martens, Olson & Bear, LLP (57) ABSTRACT

A disk device according to an embodiment includes head gimbal assemblies, a ramp, and magnetic disks. The ramp has a wall and protrusions arranged in an axial direction with a gap. Each of the protrusions includes a first surface facing the gap, a second surface located opposite to the first surface, a side surface, and a limiter protruding from the side surface. Each of the first surface and the second surface includes a first inclined region, a first flat region, and a first middle region located between the first inclined region and the first flat region. The limiter is located between two first flat regions. A width between two first middle regions is less than or equal to a width between the two first flat regions and is at least partially shorter than the width between the two first flat regions.

11 Claims, 4 Drawing Sheets

(56) References Cited

U.S. PATENT DOCUMENTS

| | | | |
|---|---|---|---|
| 11,594,248 B1* | 2/2023 | Tukada | G11B 5/4826 |
| 11,749,308 B2* | 9/2023 | Kato | G11B 33/022 360/240 |
| 2005/0207066 A1* | 9/2005 | Kobayashi | G11B 21/22 |
| 2007/0081269 A1* | 4/2007 | Kim | G11B 21/22 |
| 2008/0204925 A1* | 8/2008 | Ohta | G11B 21/12 |
| 2010/0061012 A1* | 3/2010 | Seki | G11B 5/54 360/99.06 |

* cited by examiner

DISK DEVICE AND RAMP

CROSS-REFERENCE TO RELATED APPLICATIONS

This application is based upon and claims the benefit of priority from Japanese Patent Application No. 2023-193449, filed on Nov. 14, 2023; the entire contents of which are incorporated herein by reference.

FIELD

Embodiments described herein relate generally to a disk device and a ramp.

BACKGROUND

A disk device such as a hard disk drive (HDD) includes, for example, a plurality of magnetic disks, a plurality of head gimbal assemblies (HGA), and a ramp. An HGA rotates between a load position where a slider of the HGA is positioned on a surface of a magnetic disk and an unload position where the HGA is held by the ramp.

The thickness of an HDD is restricted by, for example, standards. Components of the HDDs is accommodated in an internal space of HDD. In a case where the number of magnetic disks is large, the components are formed thinner or located closer to each other in the thickness direction, for example. Therefore, manufacture of the ramp may become difficult.

DETAILED DESCRIPTION

In general, according to an embodiment, a disk device includes a plurality of head gimbal assemblies, a ramp, and a plurality of magnetic disks. The plurality of head gimbal assemblies are rotatable about a first rotation axis. The ramp has a wall and a plurality of protrusions. The plurality of protrusions protrude from the wall towards the first rotation axis and are arranged in an axial direction along the first rotation axis with a gap interposed between the plurality of protrusions. The plurality of magnetic disks are rotatable about a second rotation axis separated from the plurality of protrusions in a first rotation direction about the first rotation axis. Each of the plurality of protrusions includes a first surface facing the gap, a second surface located opposite to the first surface, a side surface located between the first surface and the second surface, and facing the first rotation axis, and a limiter protruding from the side surface. Each of the first surface and the second surface includes a first inclined region located at an end of corresponding one of the plurality of protrusions in the first rotation direction, a first flat region separated from the first inclined region in a second rotation direction opposite to the first rotation direction, and a first middle region located between the first inclined region and the first flat region. The limiter is located between the first flat region of the first surface and the first flat region of the second surface. The first inclined region of the first surface and the first inclined region of the second surface extend from the first middle region in a tapered manner in the first rotation direction. A width between the first middle region of the first surface and the first middle region of the second surface is less than or equal to a width between the first flat region of the first surface and the first flat region of the second surface and is at least partially shorter than the width between the first flat region of the first surface and the first flat region of the second surface.

Hereinafter, one embodiment will be described with reference to FIGS. 1 to 4. Note that, in the present specification, components according to embodiments and description of the components may be described in a plurality of expressions. The components and the description thereof are examples and are not limited by the expression of the present specification. The components may also be specified with names different from those used herein. In addition, the components may be described by an expression different from the expressions used herein.

In the following description, to "prevent" is defined as, for example, to prevent occurrence of an event, an action, or an influence or to reduce the degree of an event, an action, or an influence. Furthermore, in the following description, to "limit" is defined as, for example, to prevent movement or rotation or to allow movement or rotation within a predetermined range while preventing movement or rotation beyond the predetermined range.

Figure 1:
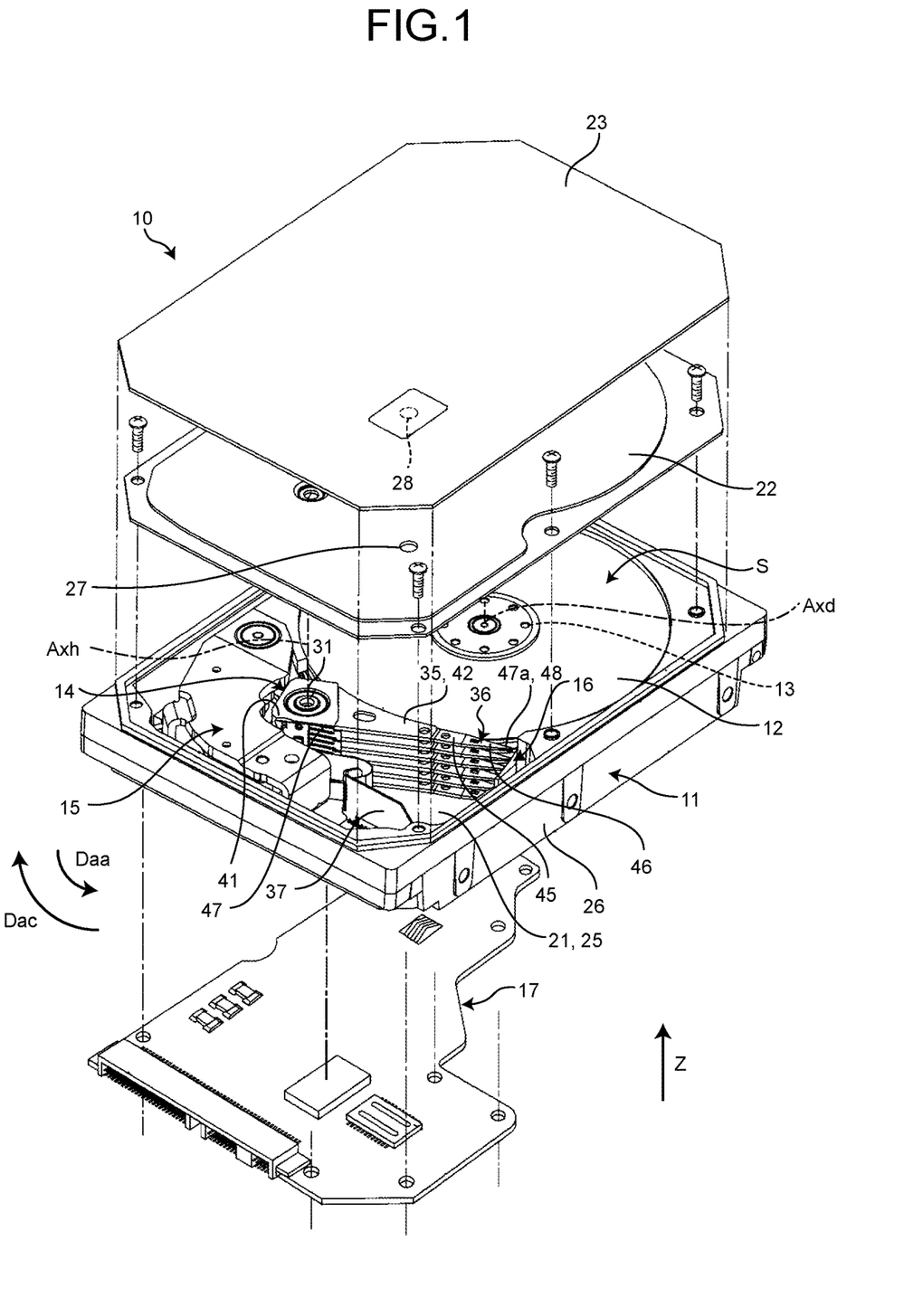
FIG. 1 is an exemplary exploded perspective view illustrating an HDD according to one embodiment.

FIG. 1 is an exemplary perspective view illustrating a hard disk drive (HDD) 10 according to the present embodiment in an exploded view. The HDD 10 is an example of a disk device and may also be referred to as an electronic device, a storage device, an external storage device, or a magnetic disk device. The HDD 10 of the present embodiment is a 3.5 inch HDD. Note that the HDD 10 may be other HDDs such as a 2.5 inch HDD.

As illustrated in the drawings, in the present specification, a Z axis is defined for convenience. The Z axis is provided along the thickness of the HDD 10. Furthermore, in the present specification, a Z direction is defined. The Z direction is a direction along the Z axis and includes a +Z direction indicated by an arrow of the Z axis and a −Z direction which is an opposite direction of the arrow of the Z axis. The +Z direction and the −Z direction are examples of a first direction.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. The magnetic disks 12 may also be referred to as disks, media, or platters. The ramp load mechanism 16 is an example of a ramp.

The housing 11 includes an internal space S. The housing 11 accommodates the plurality of magnetic disks 12, the spindle motor 13, the HSA 14, the VCM 15, and the ramp load mechanism 16 in the internal space S. The housing 11 has a base 21, an inner cover 22, and an outer cover 23. Note that the housing 11 is not limited to this example.

The base 21 is formed in a substantially rectangular parallelepiped box shape opened in the +Z direction. The base 21 has a bottom wall 25 and a side wall 26. The bottom wall 25 is formed in a substantially rectangular (quadrangular) plate shape. The side wall 26 protrudes substantially in the +Z direction from the edges of the bottom wall 25 and is formed in a substantially rectangular frame shape. The internal space S is located inside the side wall 26 having the frame shape.

The inner cover 22 is attached to the side wall 26 with, for example, screws to close the internal space S. The outer cover 23 covers the inner cover 22 and is attached to the end of the side wall 26 in the +Z direction by welding, for example.

The internal space S is filled with a gas different from air. For example, the internal space S is filled with the gas through the ventilation port 27 of the inner cover 22 and the ventilation port 28 of the outer cover 23, and the ventilation port 28 is sealed with a sticker.

The gas filled in the internal space S is, for example, a low-density gas having a density lower than that of air, an inert gas having low reactivity, or the like. For example, the internal space S is filled with helium. Note that the internal space S may be filled with another fluid.

The plurality of magnetic disks 12 is each formed in a disk shape arranged substantially parallel to the bottom wall 25. The diameter of a magnetic disk 12 is, for example, about 96 mm. The thickness of the magnetic disk 12 is, for example, 0.5 mm. Note that the diameter and the thickness of the magnetic disk 12 are not limited to this example.

The plurality of magnetic disks 12 is arranged in the Z direction at intervals of, for example, 1.4 mm. Note that the interval between the magnetic disks 12 is not limited to this example. A spacer ring is interposed between two adjacent magnetic disks 12. The spacer ring maintains a gap between the two magnetic disks 12. A thinner magnetic disk having a thickness of 0.45 mm or less may be produced from a Young's modulus material more than 90 GPa, for example. Such thinner magnetic disks allow the HDD to include twelve magnetic disks.

The HDD 10 according to the present embodiment includes, for example, eleven magnetic disks 12. Note that the number of the magnetic disks 12 may be twelve or more or ten or less. Each dimension described above may vary depending on the number of magnetic disks 12.

The spindle motor 13 supports the plurality of magnetic disks 12. The plurality of magnetic disks 12 is held by a hub of the spindle motor 13 by, for example, a clamp spring. The spindle motor 13 rotates the plurality of magnetic disks 12 about a central axis Axd. The central axis Axd is an example of a second rotation axis.

The central axis Axd is a virtual central axis of rotation of the magnetic disks 12 and extends substantially in the Z direction. The central axis Axd is the central axis of the magnetic disks 12 as well as the central axis of the spindle motor 13. Note that the central axis Axd is not limited to this example.

The housing 11 is provided with a support shaft 31 separated from the magnetic disks 12. The support shaft 31 extends, for example, substantially in the +Z direction from the bottom wall 25 of the housing 11. The HSA 14 is rotatably supported by the support shaft 31 in such a manner as to be rotatable about the central axis Axh. The central axis Axh is an example of the first rotation axis.

The central axis Axh is a virtual central axis of the rotation of the HSA 14 and extends substantially in the Z direction. That is, the central axis Axh extends substantially parallel to the central axis Axd. The central axis Axh is a central axis of the support shaft 31. Note that the central axis Axh is not limited to this example.

In the present specification, an axial direction, a radial direction, and a circumferential direction are defined. The axial direction is a direction along the central axis Axh. The axial direction in the present embodiment is equal to the Z direction. The radial direction is a direction orthogonal to the central axis Axh and includes a plurality of directions orthogonal to the central axis Axh. The circumferential direction is a direction rotating about the central axis Axh and includes a clockwise direction Dac around the central axis Axh and a counterclockwise direction Daa opposite to the clockwise direction Dac. The clockwise direction Dac is an example of the second rotation direction and a fourth direction. The counterclockwise direction Daa is an example of the first rotation direction and a third direction. The clockwise direction Dac and the counterclockwise direction Daa are orthogonal to (intersect with) the axial direction.

The HSA 14 includes a carriage 35, a plurality of head gimbal assemblies (HGA) 36, and a flexible printed circuit board (FPC) 37. The carriage 35 includes an actuator block 41 and a plurality of arms 42.

The actuator block 41 is supported by the support shaft 31 via a bearing in such a manner as to be rotatable about the support shaft 31, for example. The plurality of arms 42 protrudes from the actuator block 41 in the radial direction substantially in parallel to each other.

The plurality of arms 42 is arranged at intervals in the axial direction. Each of the plurality of arms 42 can enter a gap between two adjacent magnetic disks 12 among the plurality of magnetic disks 12.

The VCM 15 includes a voice coil attached to the carriage 35, a pair of yokes, and magnets provided to the yokes. The VCM 15 causes the carriage 35 to rotate about the central axis Axh.

Each of the plurality of HGAs 36 includes a base plate 45, a load beam 46, a flexure 47, and a slider 48. The base plate 45 is attached to the tip of the arm 42. The load beam 46 is formed thinner than the base plate 45 and extends from the base plate 45.

The flexure 47 is formed in an elongated belt shape. Note that the shape of the flexure 47 is not limited to this example. The flexure 47 is one type of FPCs including a metal plate (backing layer) made of stainless steel or the like, an insulating layer (base layer) formed on the metal plate, a conductive layer formed on the insulating layer and constituting a plurality pieces of wiring (wiring pattern), and an insulating layer (cover layer) covering the conductive layer.

A gimbal portion (elastic support portion) 47*a* is provided at one end of the flexure 47. The gimbal portion 47*a* is positioned on the load beam 46 and is formed to be rotatable with respect to the load beam. The slider 48 is mounted on the gimbal portion 47*a*.

The slider 48 includes a head element that records and reproduces information on and from a recording layer of the magnetic disk 12. In other words, the slider 48 reads and writes information from and to the magnetic disk 12.

The VCM 15 causes the carriage 35 to rotate and thereby causes the HGA 36 to rotate about the central axis Axh. The HGAs 36 rotate between a load position and an unload position. In the load position, the sliders 48 are positioned on the magnetic disks 12. In the unload position, the sliders 48 are away from the magnetic disks 12, and the HGAs 36 are held by the ramp load mechanism 16.

The FPC 37 is connected to the other ends of the flexures 47. For example, the plurality of flexures 47 is connected to the FPC 37. As a result, the FPC 37 is electrically connected to the plurality of sliders 48 via the wiring of the plurality of flexures 47.

The PCB 17 is disposed outside the housing 11 and is attached to the bottom wall 25 of the base 21. Various components such as an interface (I/F) connector, a controller, and a relay connector are mounted on the PCB 17. The PCB 17 is electrically connected to the FPC 37 through the relay connector.

Figure 2:
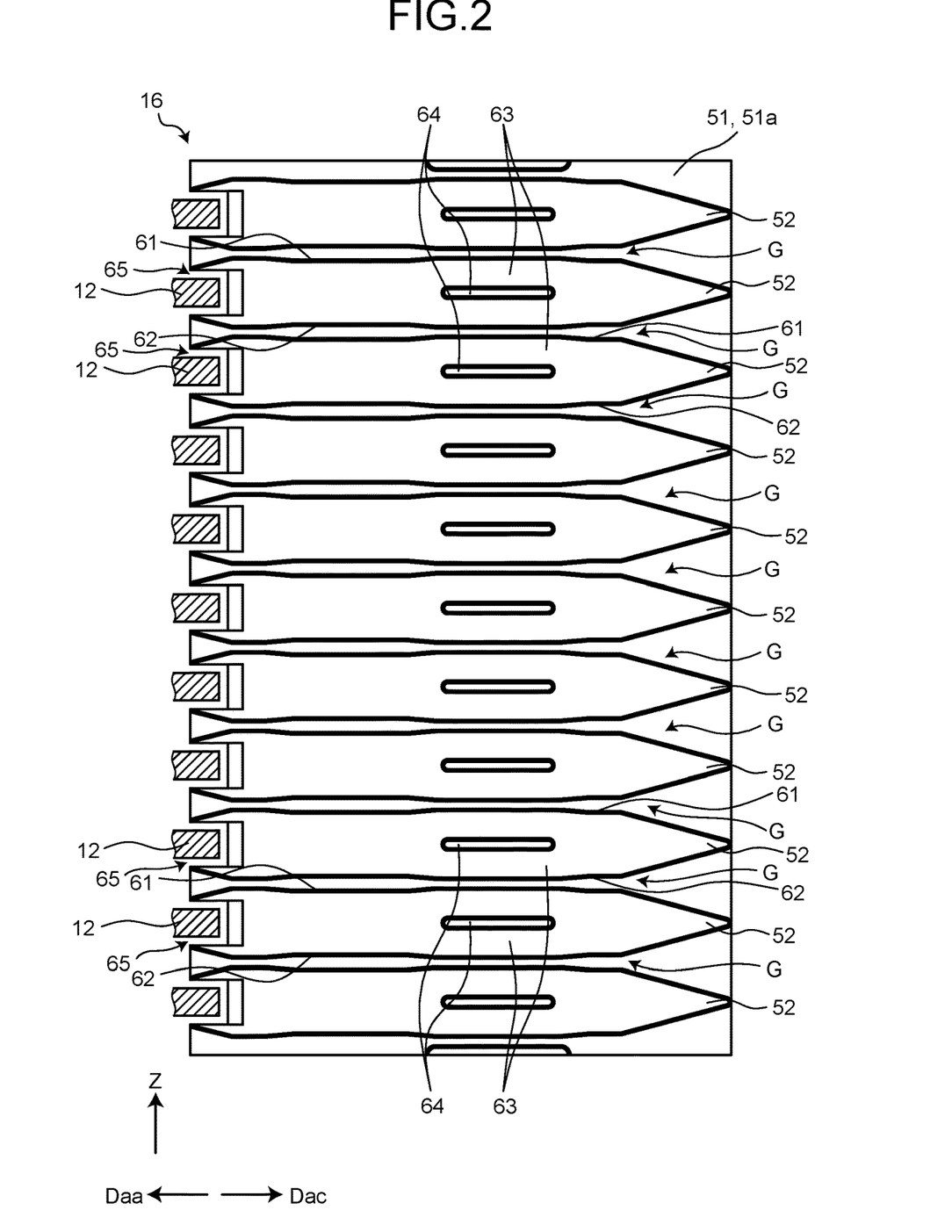
FIG. 2 is an exemplary front view illustrating a ramp load mechanism of the embodiment.

FIG. 2 is an exemplary front view illustrating the ramp load mechanism 16 of the present embodiment. As illustrated in FIG. 2, the ramp load mechanism 16 has a wall 51 and a plurality of protrusions 52.

The wall 51 and the plurality of protrusions 52 are integrally formed and are made of, for example, a synthetic resin. Note that the wall 51 and the protrusions 52 may be members different from each other and may be made of other materials.

The wall 51 is formed in, for example, a plate shape intersecting the radial direction. The wall 51 has a side surface 51*a*. The side surface 51*a* faces the central axis Axh. The side surface 51*a* is, for example, a curved surface extending around the central axis Axh or a plane substantially orthogonal to the radial direction. Note that the side surface 51*a* is not limited to this example.

Figure 3:
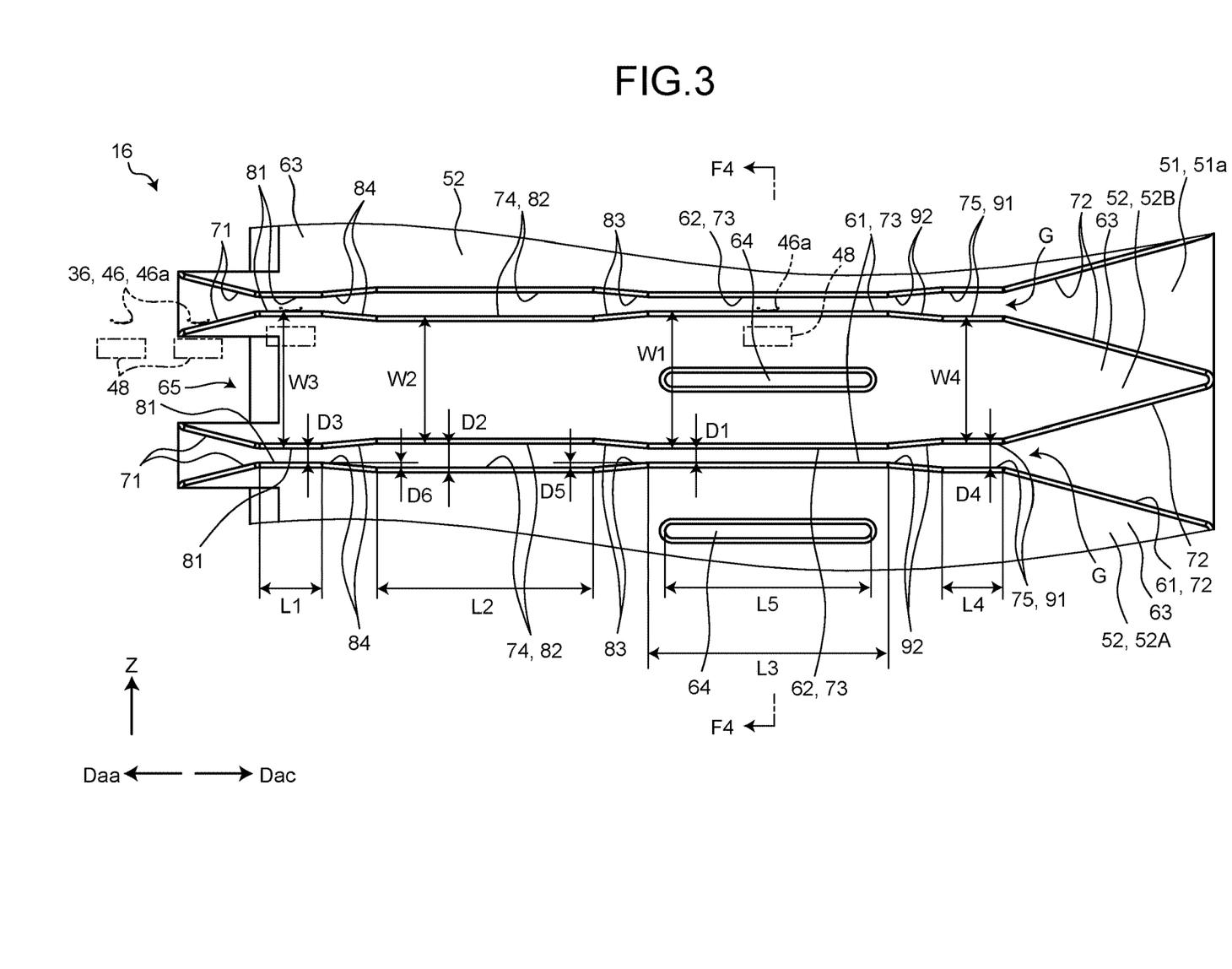
FIG. 3 is an exemplary front view illustrating a part of the ramp load mechanism of the embodiment.
Figure 4:
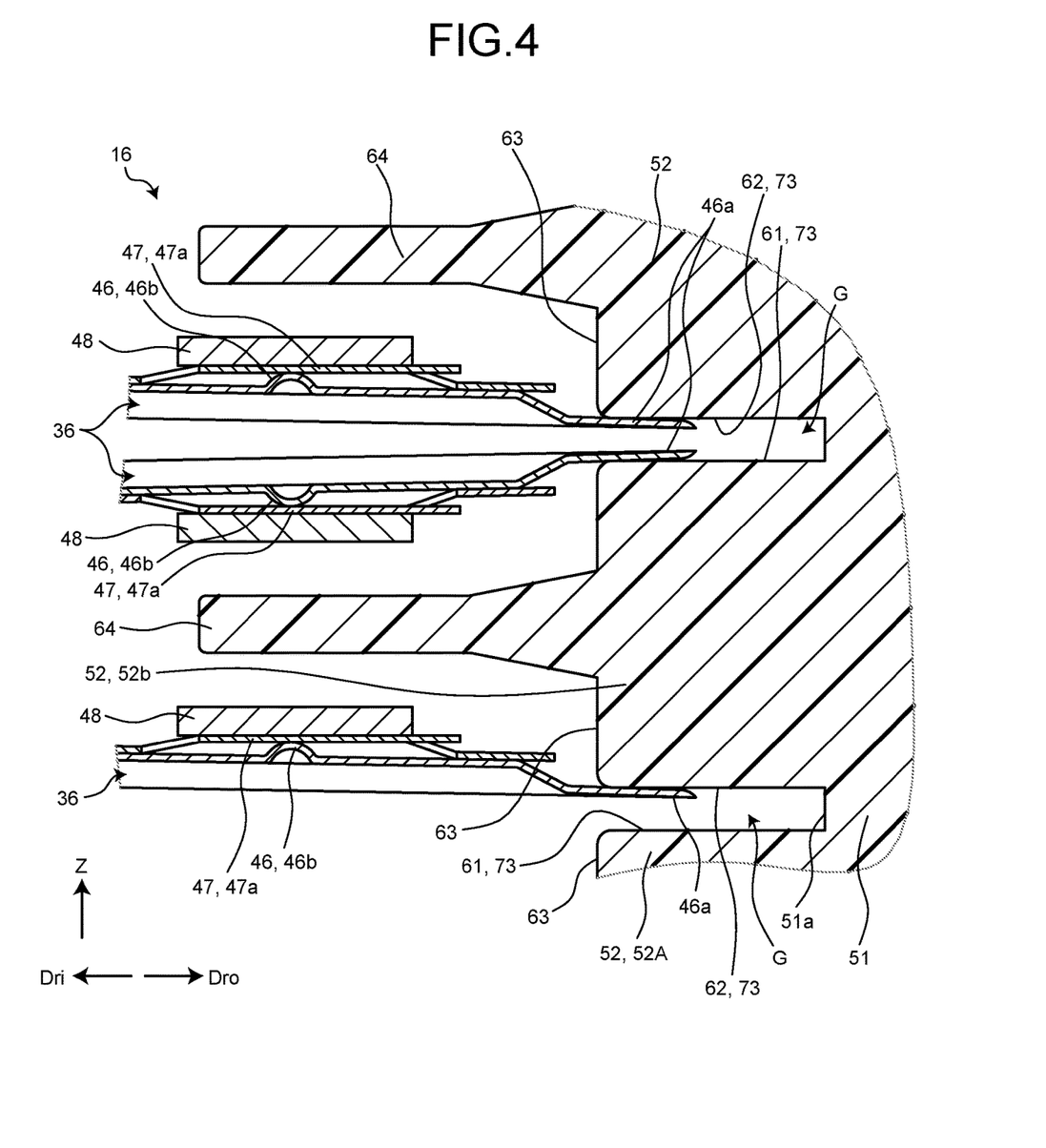
FIG. 4 is an exemplary cross-sectional view illustrating a part of the ramp load mechanism of the embodiment taken along line F4-F4 in FIG. 3.

FIG. 3 is an exemplary front view illustrating a part of the ramp load mechanism 16 of the present embodiment. FIG. 4 is an exemplary cross-sectional view illustrating a part of the ramp load mechanism 16 of the present embodiment taken along line F4-F4 of FIG. 3.

As illustrated in FIG. 4, the radial direction includes an inward direction Dri and an outward direction Dro. The inward direction Dri is an example of a second direction. The inward direction Dri is one direction orthogonal to the central axis Axh. That is, the inward direction Dri is orthogonal to (intersects with) the Z direction (+Z direction and −Z direction) and the circumferential direction (clockwise direction Dac and counterclockwise direction Daa). The side surface 51*a* faces in the inward direction Dri. That is, the inward direction Dri corresponds to inside in the radial direction. The outward direction Dro is a direction opposite to the inward direction Dri and corresponds to outside in the radial direction.

Each of the plurality of protrusions 52 protrudes in the inward direction Dri from the side surface 51*a* of the wall 51. That is, the plurality of protrusions 52 protrude from the wall 51 towards the central axis Axh substantially in parallel with each other. The plurality of protrusions 52 is arranged in the axial direction (+Z direction and −Z direction) with gaps G interposed therebetween. The number of the protrusions 52 is equal to the number of magnetic disks 12.

The plurality of protrusions 52 is formed in, for example, a block shape or a plate shape extending substantially in the circumferential direction. The plurality of protrusions 52 have mutually substantially the same shape. Note that the shape of the plurality of protrusions 52 is not limited to this example.

As illustrated in FIG. 3, each of the plurality of protrusions 52 has an upper surface 61, a lower surface 62, a side surface 63, and a limiter 64. The limiter 64 may also be referred to as a slider limiter. Note that the names of the upper surface 61 and the lower surface 62 are specified for convenience on the basis of FIGS. 2 to 4 and do not limit the orientation, the position, and the use mode. One of the upper surface 61 and the lower surface 62 is an example of the first surface. The other of the upper surface 61 and the lower surface 62 is an example of the second surface.

The upper surface 61 faces substantially in the +Z direction as a whole. The lower surface 62 is located opposite to the upper surface 61 and faces substantially in the −Z direction as a whole. Note that the upper surface 61 and the lower surface 62 may partially face in other directions.

A lower surface 62 of one protrusion 52 located at the end in the +Z direction in the row of the plurality of protrusions 52 faces one gap G. In this protrusion 52, the lower surface 62 is an example of the first surface.

An upper surface 61 of one protrusion 52 located at the end in the −Z direction in the row of the plurality of protrusions 52 faces one gap G. In this protrusion 52, the upper surface 61 is an example of the first surface.

An upper surface 61 and a lower surface 62 of each of the plurality of protrusions 52 not positioned at the end in the +Z direction and the end in the −Z direction in the row of the plurality of protrusions 52 each face one gap G. In these protrusions 52, the upper surfaces 61 or the lower surfaces 62 are an example of the first surface. An upper surface 61 of one protrusion 52 and a lower surface 62 of another protrusion 52 face each other through a gap G.

Hereinafter, one of two adjacent protrusions 52 is referred to as a protrusion 52A, and the other is referred to as a protrusion 52B. The protrusion 52B is separated from the protrusion 52A in the +Z direction. Therefore, the upper surface 61 of the protrusion 52A and the lower surface 62 of the protrusion 52B face each other through a gap G.

As illustrated in FIG. 4, a side surface 63 is provided between an upper surface 61 and a lower surface 62. The side surfaces 63 face in the inward direction Dri. In other words, the side surfaces 63 face the central axis Axh. Note that the side surface 51*a* of the wall 51 and the side surfaces 63 of the protrusions 52 may not be parallel to each other. For example, one of the side surface 51*a* of the wall 51 and the side surfaces 63 of the protrusions 52 may be a curved surface extending in the circumferential direction, and the other may be a flat surface substantially orthogonal to the radial direction.

A limiter 64 protrudes from a side surface 63 in the inward direction Dri. The limiter 64 is separated from the upper surface 61 and the lower surface 62. For example, the limiter 64 is located substantially at the center of the protrusion 52 in the axial direction. The limiter 64 is formed in a thin plate shape extending substantially in the circumferential direction. Note that the limiter 64 is not limited to this example.

As illustrated in FIG. 2, a cutout 65 is located in each of the plurality of protrusions 52. The cutout 65 is located at an end of the protrusion 52 in the counterclockwise direction Daa. A part of a magnetic disk 12 is disposed in the cutout 65.

As illustrated in FIG. 3, an upper surface 61 and a lower surface 62 each have inclined regions 71 and 72, a flat region 73, and middle regions 74 and 75. Note that the upper surfaces 61 and the lower surfaces 62 are not limited to this example. The inclined region 71 is an example of the first inclined region and may also be referred to as a slope. The inclined region 72 is an example of the fourth inclined region. The flat region 73 is an example of a first flat region and may also be referred to as a flat portion or a retraction region. The middle region 74 is an example of the first middle region. The middle region 75 is an example of a second middle region.

The inclined region 71 is located at the end of the protrusion 52 in the counterclockwise direction Daa. The inclined region 72 is located at the end of the protrusion 52 in the clockwise direction Dac. The flat region 73 is separated from the inclined region 71 in the clockwise direction Dac and is separated from the inclined region 72 in the counterclockwise direction Daa.

The middle region 74 is located between the inclined region 71 and the flat region 73. The middle region 74 includes flat regions 81 and 82 and inclined regions 83 and 84. The flat region 81 is an example of a second flat region. The flat region 82 is an example of a third flat region. The inclined region 83 is an example of a second inclined region. The inclined region 84 is an example of a third inclined region.

The flat region 81 is connected to an end of the inclined region 71 in the clockwise direction Dac. The flat region 82 is located between the flat region 73 and the flat region 81. The inclined region 83 is located between the flat region 73 and the flat region 82. The inclined region 84 is located between the flat region 81 and the flat region 82.

The middle region 75 is located between the inclined region 72 and the flat region 73. The middle region 75 includes a flat region 91 and an inclined region 92. The flat region 91 is an example of a fourth flat region. The inclined region 92 is an example of a fifth inclined region. The flat region 91 is connected to an end of the inclined region 72 in the counterclockwise direction Daa. The inclined region 92 is located between the flat region 73 and the flat region 91.

The flat regions 73, 81, 82, and 91 are substantially parallel planes. The flat regions 73, 81, 82, and 91 of the upper surface 61 face substantially in the +Z direction. The flat regions 73, 81, 82, and 91 of the lower surface 62 face substantially in the −Z direction.

The flat region 73 and the flat region 81 are at the same position in the axial direction. In other words, the flat region 73 and the flat region 81 are arranged on substantially the same plane. The flat region 73 and the flat region 81 are located outermost in the protrusion 52 in the axial direction. The flat regions 73 and 81 on the upper surface 61 of the protrusion 52A are portions closest to the protrusion 52B. Note that the flat regions 73 and 81 are not limited to this example.

The flat region 82 and the flat region 91 are at the same position in the axial direction. In other words, the flat region 82 and the flat region 91 are arranged on substantially the same plane. The flat regions 82 and 91 on the upper surface 61 of the protrusion 52A are separated from the protrusion 52B more than the flat regions 73 and 81 are.

The flat region 73 is located between the flat region 82 and the flat region 91. Furthermore, in the circumferential direction, the flat region 82 is located between the flat region 81 and the flat region 73. That is, the flat regions 73 and 81 close to another protrusion 52 and the flat regions 82 and 91 far from the other protrusion 52 are alternately arranged in the circumferential direction.

A width between the middle region 74 of the upper surface 61 and the middle region 74 of the lower surface 62 is less than or equal to a width W1 between the flat region 73 of the upper surface 61 and the flat region 73 of the lower surface 62. Furthermore, the width between the middle region 74 of the upper surface 61 and the middle region 74 of the lower surface 62 is at least partially shorter than the width W1.

In the present embodiment, a width W2 between the flat region 82 of the upper surface 61 and the flat region 82 of the lower surface 62 is shorter than the width W1. Furthermore, the width W2 is shorter than a width W3 between the flat region 81 of the upper surface 61 and the flat region 81 of the lower surface 62. The width W3 is substantially equal to the width W1.

A width between the middle region 75 of the upper surface 61 and the middle region 75 of the lower surface 62 is shorter than the width W1. For example, a width W4 between the flat region 91 of the upper surface 61 and the flat region 91 of the lower surface 62 is shorter than the width W1.

The inclined regions 71, 72, 83, 84, and 92 are planes inclined with respect to the flat regions 73, 81, 82, and 91. Note that at least one of the inclined regions 71, 72, 83, 84, and 92 may be a curved surface.

The inclined region 71 of the upper surface 61 and the inclined region 71 of the lower surface 62 extend from the middle regions 74 in such a manner as to taper in the counterclockwise direction Daa. In other words, the inclined region 71 of the upper surface 61 and the inclined region 71 of the lower surface 62 extend in such a manner as to approach each other in the counterclockwise direction Daa. A cutout 65 is located between the inclined region 71 of the upper surface 61 and the inclined region 71 of the lower surface 62. The inclined region 72 of the upper surface 61 and the inclined region 72 of the lower surface 62 extend from the middle regions 75 in such a manner as to taper in the clockwise direction Dac.

The angle between flat region 73 and the inclined region 83 is smaller than the angle between the flat region 81 and the inclined region 71. The angle between the flat region 81 and the inclined region 84 is smaller than the angle between flat region 81 and the inclined region 71. The angle between the flat region 73 and the inclined region 92 is smaller than the angle between flat region 73 and the inclined region 71.

The angle between the flat region 73 and the inclined region 83, the angle between the flat region 81 and the inclined region 84, and he angle between the flat region 73 and the inclined region 92 are each less than or equal to 10°, for example, about 5°. The angle between the flat region 81 and the inclined region 71 and the angle between the flat region 91 and the inclined region 72 are each between 14° to 20°. Note that the various angles described above are not limited to the above examples.

A length L1 of the flat region 81 is shorter than a length L2 of the flat region 82 around the central axis Axh. Furthermore, a length L3 of the flat region 73 is longer than a length L2 of the flat region 82 around the central axis Axh. Around the central axis Axh, a length L4 of the flat region 91 is shorter than the length L3 of the flat region 73.

The limiter 64 is located between the flat region 73 of the upper surface 61 and the flat region 73 of the lower surface 62. Around the central axis Axh, the length L3 of the flat region 73 is longer than a length L5 of the limiter 64. The length L3 is, for example, about 2.5 mm. The length L5 is, for example, about 2 mm. Note that the various lengths described above are not limited to the above examples.

A distance D1 between the flat region 73 of the upper surface 61 of the protrusion 52A and the flat region 73 of the lower surface 62 of the protrusion 52B is narrower than a distance D2 between the flat region 82 of the upper surface 61 of the protrusion 52A and the flat region 82 of the lower surface 62 of the protrusion 52B. A distance D3 between the flat region 81 of the upper surface 61 of the protrusion 52A and the flat region 81 of the lower surface 62 of the protrusion 52B is narrower than the distance D2.

The distance D1 is narrower than a distance D4 between the flat region 91 of the upper surface 61 of the protrusion 52A and the flat region 91 of the lower surface 62 of the protrusion 52B. That is, the gap G at the flat regions 73 is narrower than the gap G at the flat regions 82 and narrower than the gap G at the flat regions 91.

The distance D3 is narrower than the distance D4. That is, the gap G at the flat regions 81 is narrower than the gap G at the flat regions 82 and narrower than the gap G at the flat regions 91. In other words, the gap G is narrow at the flat regions 73 and 81 and wide at the flat regions 82 and 91.

Each of the distance D1 and the distance D3 is, for example, about 0.222 mm. Each of the distance D2 and the distance D4 is, for example, about 0.322 mm. In the axial direction (+Z direction and −Z direction), a distance D5 between the flat region 73 and the flat region 82 and a distance D6 between the flat region 81 and the flat region 82 are each between 20 μm and 80 μm, for example, about 50 μm. Note that the distances D1, D2, D3, D4, D5, and D6 are not limited to the above examples.

The central axis Axd of the magnetic disks 12 is separated from the plurality of protrusions 52 in the counterclockwise direction Daa. Note that, in the radial direction, the position of the central axis Axd may be separated from extended lines of the protrusions 52 in the circumferential direction.

As illustrated in FIG. 4, a load beam 46 has a lift tab 46a. The lift tab 46a is provided at the tip of the load beam 46. The slider 48 is closer to the central axis Axh than the lift tab 46a is. When the HGA 36 is in the unload position, a protrusion 52 supports the lift tab 46a.

For example, when the HGA 36 is in the load position, the slider 48 is positioned on a magnetic disk 12, and the lift tab 46a is separated from the protrusion 52. When the HGA 36 moves from the load position to the unload position, the HGA 36 rotates in the clockwise direction Dac.

As schematically illustrated by a two-dot chain line in FIG. 3, with the HGA 36 rotating in the clockwise direction Dac, the lift tab 46a abuts on the inclined region 71. As the HGA 36 further rotates in the clockwise direction Dac, the lift tab 46a moves along the inclined region 71 and gets separated from the magnetic disk 12 in the axial direction.

When the lift tab 46a is separated from the magnetic disk 12 by a predetermined distance in the axial direction, the slider 48 is also separated from the magnetic disk 12 in the axial direction. That is, the slider 48 is pulled away from the magnetic disk 12. Before the lift tab 46a reaches the flat region 81, the slider 48 is separated from the magnetic disk 12.

With the HGA 36 further rotating in the clockwise direction Dac, the lift tab 46a is supported by the flat region 81. That is, the flat region 81 is located just behind the inclined region 71. The lift tab 46a passes through the flat region 81, the inclined region 84, the flat region 82, and the inclined region 83 and reaches the flat region 73. The HGA 36 stops rotating at a position (home position) where the lift tab 46a is supported by the flat region 73 and completes the movement to the unload position.

As illustrated in FIG. 4, when the lift tab 46a is supported in the flat region 73, a limiter 64 is located between two sliders 48. The limiter 64 is separated from the two sliders 48. For example, in a case where the HGAs 36 vibrate in the axial direction due to an external force, the two sliders 48 may approach each other. However, since the limiter 64 is located between the two sliders 48, the movement of the sliders 48 in the axial direction can be limited, whereby the two sliders 48 can be prevented from interfering with each other.

When the lift tab 46a is supported by the flat region 73, the limiter 64 covers a dimple 46b of the load beam 46 in the axial direction. The dimple 46b is a substantially hemispherical protrusion and rotatably supports a gimbal portion 47a. In the radial direction, the length of the limiter 64 is longer than the distance between the side surface 51a of the wall 51 and the dimple 46b when the lift tab 46a is supported by the flat region 73.

The limiter 64 is not limited to the above example. For example, the limiter 64 may be positioned between two gimbal portions 47a. When two sliders 48 approach each other, the limiter 64 can prevent the two sliders 48 from interfering with each other by abutting on a gimbal portion 47a.

The dimension of the HDD 10 in the axial direction is restricted by, for example, standards. For example, in the technical field of HDDs, the Small Form Factor Committee has formulated SFF-8300 which is a form factor of 3.5 inch HDDs. The SFF-8300 sets a plurality of maximum dimensions for the dimensions of the HDDs in the axial direction.

The dimension of the HDD 10 in the axial direction is restricted, whereas the HDD 10 has a large number of magnetic disks 12. In addition, the HDD 10 includes a large number of HGAs 36 and a large number of protrusions 52 depending on the number of magnetic disks 12. That is, the size and the arrangement of the protrusions 52 in the axial direction are also restricted. However, the HDD 10 of the present embodiment can prevent impairment of the function of the ramp load mechanism 16 and facilitate the manufacture of the ramp load mechanism 16.

For example, the length of the inclined region 71 in the axial direction is also restricted. The inclined region 71 is located at a position where the inclined region 71 can abut on the lift tab 46a moving from the load position to the unload position. However, due to variations in dimensions, variations may occur in the relative positions of the lift tab 46a and the inclined region 71 in the axial direction. The longer the inclined region 71 is in the axial direction, the more reliably the inclined region 71 can abut on the lift tab 46a.

In the present embodiment, since the distance D3 is set to be narrower than the distance D2 and the distance D4, the inclined region 71 can be lengthened in the axial direction as compared with a case where the distance D3 is set to be wide. Therefore, when the HGA 36 moves from the load position to the unload position, the inclined region 71 can more reliably abut on the lift tab 46a.

The thickness of the limiter 64 in the axial direction is also restricted. The limiter 64 is disposed at a position separated from the slider 48 when the lift tab 46a is supported by the flat region 73. However, in a case where the number of the HGAs 36 and the protrusions 52 is large, the distance between the slider 48 and the limiter 64 may become short. The limiter 64 can be separated from the slider 48 by being thinned in the axial direction. However, the thickness of the limiter 64 in the axial direction has limitation due to, for example, a manufacturing device or the material.

In the present embodiment, since the distance D1 is set to be narrower than the distance D2 and the distance D4, the distance between the limiter 64 and the flat region 73 in the axial direction can be increased as compared with a case where the distance D1 is set to be wide. Therefore, the lift tab 46a supported by the flat region 73 and the slider 48 moving following the lift tab 46a can be further separated from the limiter 64.

Two lift tabs 46a pass through each gap G. Therefore, the narrow distances D1 and D3 are set such that the two lift tabs 46a can be prevented from interfering with each other. For example, tolerances of the distances D1 and D3 are set to be narrow, and the flat regions 73 and 81 are formed with high accuracy. Meanwhile, tolerances of the distances D2 and D4 are set to be wide, and the accuracy of the dimensions of the flat regions 82 and 91 can be set to be relatively low.

As described above, the upper surface 61 and the lower surface 62 are partially set with high accuracy. Therefore, the protrusions 52 can be easily formed as compared with a case where a wider region of the upper surfaces 61 and the lower surfaces 62 is set with high accuracy.

In the HDD 10 according to the embodiment described above, the HGAs 36 are rotatable about the central axis Axh. The ramp load mechanism 16 includes the wall 51 and the plurality of protrusions 52 protruding from the wall 51 towards the central axis Axh and arranged in the axial direction along the central axis Axh with the gaps G interposed therebetween. The plurality of magnetic disks 12 is rotatable about the central axis Axd separated from the plurality of protrusions 52 in the counterclockwise direction Daa around the central axis Axh. Each of the plurality of protrusions 52 has an upper surface 61, a lower surface 62, a side surface 63, and a limiter 64. The upper surface 61 faces a gap G. The lower surface 62 is located opposite to the upper surface 61. The side surface 63 is located between the upper surface 61 and the lower surface 62 and faces the central axis Axh. The limiter 64 protrudes from the side surface 63. The upper surface 61 and the lower surface 62 each have an inclined region 71, a flat region 73, and a middle region 74. The inclined region 71 is located at ends of the plurality of protrusions 52 in the counterclockwise direction Daa. The flat region 73 is separated from the inclined region 71 in the clockwise direction Dac opposite to the counterclockwise direction Daa. The middle region 74 is located between the inclined region 71 and the flat region 73. The limiter 64 is located between the flat region 73 of the upper surface 61 and the flat region 73 of the lower surface 62. The inclined region 71 of the upper surface 61 and the inclined region 71 of the lower surface 62 extend from the middle regions 74 in such a manner as to taper in the counterclockwise direction Daa. The width between the middle region 74 of the upper surface 61 and the middle region 74 of the lower surface 62 is less than or equal to the width W1 between the flat region 73 of the upper surface 61 and the flat region 73 of the lower surface 62 and is at least partially shorter than the width W1.

Furthermore, the ramp load mechanism 16 has the wall 51 and the plurality of protrusions 52. The plurality of protrusions 52 is arranged in the axial direction (+Z direction or −Z direction) with the gaps G interposed therebetween and protrudes from the wall 51 in the inward direction Dri intersecting the axial direction. Each of the plurality of protrusions 52 has an upper surface 61, a lower surface 62, a side surface 63, and a limiter 64. The upper surface 61 faces a gap G. The lower surface 62 is located opposite to the upper surface 61. The side surface 63 is located between the upper surface 61 and the lower surface 62 and faces in the inward direction Dri. The limiter 64 protrudes from the side surface 63. The upper surface 61 and the lower surface 62 each have an inclined region 71, a flat region 73, and a middle region 74. The inclined region 71 is located at ends of the plurality of protrusions 52 in the counterclockwise direction Daa intersecting the axial direction and the inward direction Dri. The flat region 73 is separated from the inclined region 71 in the clockwise direction Dac opposite to the counterclockwise direction Daa. The middle region 74 is located between the inclined region 71 and the flat region 73. The limiter 64 is located between the flat region 73 of the upper surface 61 and the flat region 73 of the lower surface 62. The inclined region 71 of the upper surface 61 and the inclined region 71 of the lower surface 62 extend from the middle regions 74 in such a manner as to taper in the counterclockwise direction Daa. The width between the middle region 74 of the upper surface 61 and the middle region 74 of the lower surface 62 is less than or equal to the width W1 between the flat region 73 of the upper surface 61 and the flat region 73 of the lower surface 62 and is at least partially shorter than the width W1.

Since the lower surface 62 is located opposite to the upper surface 61, the lower surfaces 62 of most of the plurality of protrusions 52 also face a gap G. That is, an upper surface 61 of one protrusion 52A and a lower surface 62 of another protrusion 52B face each other through a gap G. Each of the upper surface 61 and the lower surface 62 facing the gap G can each support a lift tab 46a of an HGA 36. The limiter 64 is positioned between the two sliders 48 of the two HGAs 36 to prevent the two sliders 48 from touching each other while a lift tab 46a of one HGA 36 is supported by the flat region 73 of the upper surface 61 and a lift tab 46a of another HGA 36 is supported by the flat region 73 of the lower surface 62. That is, the flat regions 73 supports the lift tabs 46a while the HGAs 36 are positioned in the unload position. The dimension of the HDD 10 in the axial direction is restricted by, for example, standards. In a case where the number of magnetic disks 12 is large despite that the dimension of the HDD 10 in the axial direction is restricted, each component of the HDD 10 is thinned or brought close in the axial direction in order to be arranged within the restricted dimension. For example, the limiter 64 and the slider 48 may approach each other. However, in the present embodiment, the width W1 is set to be long. As a result, the limiter 64 is separated from the slider 48 and thus can be prevented from interfering with the slider 48. In other words, the HDD 10 according to the present embodiment does not require the limiter 64 to be thin in the axial direction, whereby formation of the limiter 64 in injection molding, for example can be facilitated.

Meanwhile, in the case where the width W1 is set to be long, the distance D1 between the flat region 73 of the upper surface 61 of the protrusion 52A and the flat region 73 of the lower surface 62 of the protrusion 52B becomes short. However, the distance between the middle region 74 of the upper surface 61 of the protrusion 52A and the middle region 74 of the lower surface 62 of the protrusion 52B is at least partially longer than the distance D1. Therefore, the distance between the two middle regions 74 is at least partially longer than the distance D1 even if the positions or the dimensions of the two middle regions 74 vary. Therefore, the HDD 10 of the present embodiment can reduce the possibility that two lift tabs 46a interfere with each other between an upper surface 61 and a lower surface 62 as compared with a case where the middle region 74 is continuous with the flat region 73 as an integral plane. Furthermore, the HDD 10 according to the embodiment can facilitate management of the distance between the upper surface 61 of the protrusion 52A and the lower surface 62 of the protrusion 52B.

As described above, the HDD 10 of the present embodiment can facilitate the manufacture of the ramp load mechanism 16 capable of reliably retracting the HGAs 36 to the unload position even in a case where the number of magnetic disks 12 is large. Therefore, the HDD 10 according to the present embodiment can increase the number of magnetic disks 12, thereby enabling an increase in the capacity. Furthermore, the HDD 10 can prevent a decrease in yield.

The middle region 74 has the flat region 81 and the flat region 82. The flat region 81 is connected to the inclined region 71. The flat region 82 is located between the flat region 81 and the flat region 73. The width W2 between the flat region 82 of the upper surface 61 and the flat region 82 of the lower surface 62 is shorter than the width W1 and shorter than the width W3 between the flat region 81 of the upper surface 61 and the flat region 81 of the lower surface 62.

When an HGA 36 moves from the load position to the unload position, the lift tab 46a of the HGA 36 abuts on the inclined region 71. In a case where the width W3 is set to be long, the inclined region 71 becomes long in the axial direction. As a result, in the HDD 10 of the present embodiment, even if the positions or the dimensions of the HGAs 36 or the protrusions 52 vary in the axial direction, the lift tab 46a can be more reliably brought into contact with the inclined region 71, and the slider 48 can be more reliably pulled away from the surface of the magnetic disk 12.

Meanwhile, in the case where the width W3 is set to be long, the distance D3 between the flat region 81 of the upper surface 61 of the protrusion 52A and the flat region 81 of the lower surface 62 of the protrusion 52B becomes short. However, the distance D2 is longer than the distance D3. Therefore, the distance D2 is longer than the distance D3 even if the positions or the dimensions of the two flat regions 82 vary. Therefore, the HDD 10 of the present embodiment can reduce the possibility that the two lift tabs 46a interfere with each other in the gap G between the upper surface 61 and the lower surface 62 as compared with a case where the flat region 82 is continuous with the flat region 81 as an integral plane. Furthermore, the HDD 10 according to the embodiment can facilitate management of the distance between the upper surface 61 of the protrusion 52A and the lower surface 62 of the protrusion 52B.

As described above, the HDD 10 of the present embodiment can facilitate the manufacture of the ramp load mechanism 16 capable of reliably retracting the HGAs 36 to the unload position even in a case where the number of magnetic disks 12 is large. Therefore, the HDD 10 according to the present embodiment can increase the number of magnetic disks 12, thereby enabling an increase in the capacity. Furthermore, the HDD 10 can prevent a decrease in yield.

The flat region 73 and the flat region 81 are at the same position in the axial direction. As a result, the HDD 10 of the present embodiment can maximize the distance between the limiter 64 and the slider 48 and maximize the length of the inclined region 71 in the axial direction.

The middle region 74 includes an inclined region 83 and an inclined region 84. The inclined region 83 is located between the flat region 73 and the flat region 82. The inclined region 84 is located between the flat region 81 and the flat region 82. The angle (about) 5° between the flat region 73 and the inclined region 83 is smaller than the angle (between 14° and) 20° between the flat region 81 and the inclined region 71. The angle (about) 5° between the flat region 81 and the inclined region 84 is smaller than the angle (between 14° and) 20° between the flat region 81 and the inclined region 71. As a result, the HDD 10 of the present embodiment can reduce the sliding resistance of the lift tab 46a in the movement among the flat regions 73, 81, and 82.

The angle (about) 5° between the flat region 73 and the inclined region 83 and the angle (about 5°) between the flat region 81 and the inclined region 84 are each less than or equal to 10°. As a result, the HDD 10 of the present embodiment can reduce the sliding resistance of the lift tab 46a in the movement among the flat regions 73, 81, and 82.

In the axial direction, the distance between the flat region 73 and the flat region 82 and the distance between the flat region 81 and the flat region 82 are each between 20 μm and 80 μm. As a result, the HDD 10 of the present embodiment can reduce the sliding resistance of the lift tab 46a in the movement among the flat regions 73, 81, and 82. Furthermore, the HDD 10 according to the present embodiment can prevent the two sliders 48 from interfering with each other when the lift tabs 46a are supported by the flat regions 82.

The flat region 81 is shorter than the flat region 82 around the central axis Axh. That is, in the gap G between the two flat regions 82, the distance D2 in the axial direction is long, and the length L2 around the central axis Axh is also relatively long. As a result, the HDD 10 of the present embodiment can further reduce the possibility that two lift tabs 46a interfere with each other.

The flat region 73 is longer than the flat region 81 around the central axis Axh. That is, the gap G between the two flat regions 81 has a short distance D3 in the axial direction but has a relatively short length L1 around the central axis Axh. As a result, the HDD 10 according to the present embodiment can further reduce the possibility that two lift tabs 46a interfere with each other between two flat regions 81. Furthermore, in the HDD 10 according to the present embodiment, the flat regions 73 are set relatively long around the central axis Axh, whereby the HGAs 36 can be more reliably disposed at the home position even if the stop position of the HGAs 36 around the central axis Axh varies due to inertia, for example.

The flat region 73 is longer than the limiter 64 around the central axis Axh. As a result, the slider 48 can be separated from the limiter 64 before the lift tab 46a supported by the flat region 73 reaches the middle region 74. Therefore, the HDD 10 according to the present embodiment can prevent the slider 48 from interfering with the limiter 64.

The upper surface 61 and the lower surface 62 each have an inclined region 72 and a middle region 75. The inclined region 72 is located at the ends of the plurality of protrusions 52 in the clockwise direction Dac. The middle region 75 is located between the flat region 73 and the inclined region 72. The inclined region 72 of the upper surface 61 and the inclined region 72 of the lower surface 62 extend from the middle regions 75 in such a manner as to taper in the clockwise direction Dac. A width between the middle region 75 of the upper surface 61 and the middle region 75 of the lower surface 62 is shorter than the width W1.

In a case where the width W1 is set to be long, the distance D1 becomes short. However, the distance between the middle region 75 of the upper surface 61 of the protrusion 52A and the middle region 75 of the lower surface 62 of the protrusion 52B is longer than the distance D1. Therefore, the distance between the two middle regions 75 is at least partially longer than the distance D1 even if the positions or the dimensions of the two middle regions 75 vary. Therefore, the HDD 10 of the present embodiment can reduce the possibility that two lift tabs 46a interfere with each other between an upper surface 61 and a lower surface 62 as compared with a case where the middle region 75 is continuous with the flat region 73 as an integral plane. Furthermore, the HDD 10 according to the embodiment can facilitate management of the distance between the upper surface 61 of the protrusion 52A and the lower surface 62 of the protrusion 52B.

The middle region 75 includes a flat region 91 and an inclined region 92. The flat region 91 is connected to the inclined region 72. The inclined region 92 is located between the flat region 73 and the flat region 91. The angle (about 5°) between the flat region 73 and the inclined region 92 is smaller than the angle (between 14° and) 20° between the flat region 73 and the inclined region 71. As a result, the HDD 10 of the present embodiment can reduce the sliding resistance of the lift tab 46a in the movement between the flat region 73 and the flat region 91.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a plurality of head gimbal assemblies rotatable about a first rotation axis;
a ramp having a wall and a plurality of protrusions protruding from the wall towards the first rotation axis, and arranged in an axial direction along the first rotation axis with a gap interposed between the plurality of protrusions; and
a plurality of magnetic disks rotatable about a second rotation axis separated from the plurality of protrusions in a first rotation direction about the first rotation axis, wherein
each of the plurality of protrusions includes a first surface facing the gap, a second surface located opposite to the first surface, a side surface located between the first surface and the second surface, and facing the first rotation axis, and a limiter protruding from the side surface,
each of the first surface and the second surface includes a first inclined region located at an end of a corresponding one of the plurality of protrusions in the first rotation direction, a first flat region separated from the first inclined region in a second rotation direction opposite to the first rotation direction, and a first middle region located between the first inclined region and the first flat region,
the limiter is located between the first flat region of the first surface and the first flat region of the second surface,
the first inclined region of the first surface and the first inclined region of the second surface extend from the first middle region in a tapered manner in the first rotation direction,
a width between the first middle region of the first surface and the first middle region of the second surface is less than or equal to a width between the first flat region of the first surface and the first flat region of the second surface and is at least partially shorter than the width between the first flat region of the first surface and the first flat region of the second surface,
the first middle region includes a second flat region and a third flat region,
the second flat region is connected to the first inclined region,
the third flat region is located between the second flat region and the first flat region, and
a width between the third flat region of the first surface and the third flat region of the second surface is shorter than a width between the first flat region of the first surface and the first flat region of the second surface and is shorter than a width between the second flat region of the first surface and the second flat region of the second surface.

2. The disk device according to claim 1, wherein the first flat region and the second flat region are at a same position in the axial direction.

3. The disk device according to claim 1, wherein the first middle region includes a second inclined region located between the first flat region and the third flat region and a third inclined region located between the second flat region and the third flat region,
an angle between the first flat region and the second inclined region is smaller than an angle between the second flat region and the first inclined region, and
an angle between the second flat region and the third inclined region is smaller than the angle between the second flat region and the first inclined region.

4. The disk device according to claim 3, wherein the angle between the first flat region and the second inclined region is less than or equal to 10°, and the angle between the second flat region and the third inclined region is less than or equal to 10°.

5. The disk device according to claim 1, wherein, in the axial direction, a distance between the first flat region and the third flat region is between 20 μm and 80 μm, and
in the axial direction, a distance between the second flat region and the third flat region is between 20 μm and 80 μm.

6. The disk device according to claim 1, wherein the second flat region is shorter than the third flat region around the first rotation axis.

7. The disk device according to claim 1, wherein the first flat region is longer than the second flat region around the first rotation axis.

8. A disk device comprising:
a plurality of head gimbal assemblies rotatable about a first rotation axis;
a ramp having a wall and a plurality of protrusions protruding from the wall towards the first rotation axis, and arranged in an axial direction along the first rotation axis with a gap interposed between the plurality of protrusions; and
a plurality of magnetic disks rotatable about a second rotation axis separated from the plurality of protrusions in a first rotation direction about the first rotation axis, wherein
each of the plurality of protrusions includes a first surface facing the gap, a second surface located opposite to the first surface, a side surface located between the first surface and the second surface, and facing the first rotation axis, and a limiter protruding from the side surface,
each of the first surface and the second surface includes a first inclined region located at an end of a corresponding one of the plurality of protrusions in the first rotation direction, a first flat region separated from the first inclined region in a second rotation direction opposite to the first rotation direction, and a first middle region located between the first inclined region and the first flat region,
the limiter is located between the first flat region of the first surface and the first flat region of the second surface,
the first inclined region of the first surface and the first inclined region of the second surface extend from the first middle region in a tapered manner in the first rotation direction,
a width between the first middle region of the first surface and the first middle region of the second surface is less than or equal to a width between the first flat region of the first surface and the first flat region of the second surface and is at least partially shorter than the width between the first flat region of the first surface and the first flat region of the second surface, and
the first flat region is longer than the limiter around the first rotation axis.

9. A disk device comprising:
a plurality of head gimbal assemblies rotatable about a first rotation axis;
a ramp having a wall and a plurality of protrusions protruding from the wall towards the first rotation axis, and arranged in an axial direction along the first rotation axis with a gap interposed between the plurality of protrusions; and
a plurality of magnetic disks rotatable about a second rotation axis separated from the plurality of protrusions in a first rotation direction about the first rotation axis, wherein
  each of the plurality of protrusions includes a first surface facing the gap, a second surface located opposite to the first surface, a side surface located between the first surface and the second surface, and facing the first rotation axis, and a limiter protruding from the side surface,
  each of the first surface and the second surface includes a first inclined region located at an end of a corresponding one of the plurality of protrusions in the first rotation direction, a first flat region separated from the first inclined region in a second rotation direction opposite to the first rotation direction, and a first middle region located between the first inclined region and the first flat region,
  the limiter is located between the first flat region of the first surface and the first flat region of the second surface,
  the first inclined region of the first surface and the first inclined region of the second surface extend from the first middle region in a tapered manner in the first rotation direction,
  a width between the first middle region of the first surface and the first middle region of the second surface is less than or equal to a width between the first flat region of the first surface and the first flat region of the second surface and is at least partially shorter than the width between the first flat region of the first surface and the first flat region of the second surface,
  each of the first surface and the second surface includes a fourth inclined region located at an end of corresponding one of the plurality of protrusions in the second rotation direction and a second middle region located between the first flat region and the fourth inclined region,
  the fourth inclined region of the first surface and the fourth inclined region of the second surface extend from the second middle region in the second rotation direction in a tapered manner, and
  a width between the second middle region of the first surface and the second middle region of the second surface is shorter than a width between the first flat region of the first surface and the first flat region of the second surface.

10. The disk device according to claim 9, wherein
the second middle region includes a fourth flat region and a fifth inclined region,
the fourth flat region is connected to the fourth inclined region,
the fifth inclined region is located between the first flat region and the fourth flat region, and
an angle between the first flat region and the fifth inclined region is smaller than an angle between the first flat region and the first inclined region.

11. A ramp comprising:
a wall; and
a plurality of protrusions arranged in a first direction with a gap interposed between the plurality of protrusions, and protruding from the wall in a second direction intersecting the first direction, wherein
each of the plurality of protrusions includes a first surface facing the gap, a second surface located opposite to the first surface, a side surface located between the first surface and the second surface, and facing in the second direction, and a limiter protruding from the side surface,
each of the first surface and the second surface includes a first inclined region located at an end of a corresponding one of the plurality of protrusions in a third direction intersecting the first direction and the second direction, a first flat region separated from the first inclined region in a fourth direction opposite to the third direction, and a first middle region located between the first inclined region and the first flat region,
the limiter is located between the first flat region of the first surface and the first flat region of the second surface,
the first inclined region of the first surface and the first inclined region of the second surface extend from the first middle region in a tapered manner in the third direction,
a width between the first middle region of the first surface and the first middle region of the second surface is less than or equal to a width between the first flat region of the first surface and the first flat region of the second surface and is at least partially shorter than the width between the first flat region of the first surface and the first flat region of the second surface,
the first middle region includes a second flat region and a third flat region,
the second flat region is connected to the first inclined region,
the third flat region is located between the second flat region and the first flat region, and
a width between the third flat region of the first surface and the third flat region of the second surface is shorter than a width between the first flat region of the first surface and the first flat region of the second surface and is shorter than a width between the second flat region of the first surface and the second flat region of the second surface.

* * * * *